United States Patent [19]

Lieb

[11] 3,763,877

[45] Oct. 9, 1973

[54] FLUID FLOW CONTROL SYSTEM
[75] Inventor: David P. Lieb, Lexington, Mass.
[73] Assignee: Thermo Electron Corporation, Waltham, Mass.
[22] Filed: Nov. 12, 1971
[21] Appl. No.: 198,297

[52] U.S. Cl. ............................... 137/117, 23/254 R
[51] Int. Cl. ............................................. G05d 7/01
[58] Field of Search ...................... 137/2, 3, 7, 8, 9, 137/13, 114, 117, 118; 23/254 R

[56] References Cited
UNITED STATES PATENTS

| 2,258,758 | 10/1941 | Haultain | 137/117 |
| 3,152,603 | 10/1964 | Zeisloft | 137/117 |
| 3,285,703 | 11/1966 | Narita et al. | 23/254 R |
| 3,543,784 | 12/1970 | Smith | 137/8 X |

Primary Examiner—Robert G. Nilson
Attorney—James L. Neal

[57] ABSTRACT

An instrument having a fluid sample treating chamber incorporating a flow control system which maintains a constant fluid sample flow to the treating chamber. The fluid sample is drawn to the chamber along a passage having two flow restricting devices in series. A bypass line has an inlet connected between the flow restrictive devices and another inlet in communication with a supplemental fluid supply. Regulating means in the bypass line governs the amount of supplemental fluid pumped through the bypass line, to thereby influence the fluid sample pressure between the flow restrictive devices and the flow of the fluid sample to the chamber.

8 Claims, 3 Drawing Figures

PATENTED OCT 9 1973 3,763,877

3,763,877

FLUID FLOW CONTROL SYSTEM

SUMMARY OF THE INVENTION

This ource. provides flow control for any system having a fluid sample treating chamber which requires a substantially constant flow of fluid thereto and which operates at a lower pressure than the pressure of the fluid sample source. This condition may exist in a wide variety of instruments including spectrophotometers and chemiluminescent detectors.

A pair of flow restricting devices in series is provided along a fluid sample supply line leading to the chamber. A bypass line having inlet connections to the supply line between the flow restricting devices and to a source of supplementary fluid draws sample fluid from the supply line and supplementary fluid from its source. Regulating means adjacent the point of communication with the supplemenatry fluid source, which operates in response to the pressure difference between a reference pressure and the pressure intermediate the pair of flow restricting devices, controls the amount of supplementary fluid drawn through the bypass line. This, in turn, regulates the pressure between the flow restricting devices and the flow of fluid sample to the chamber.

In a preferred embodiment, this invention provides a flow control system for an analytical instrument capable of measuring the amount of a gaseous constituent in a gaseous sample mixture that avoids contact between variable flow controlling devices and the gaseous sample mixture eventually taking part in the analytical reaction. The flow control system maintains a constant sample mixture flow rate despite wide variations in the pressure of the sample mixture source. In the system, a first flow restricting device in series with a second flow restricting device connects the sample mixture source to the reaction chamber. An exhaust pump connected to the reaction chamber outlet draws sample mixture through the flow restricting devices and includes a bypass pump having its inlet in communication with the atmosphere that draws off a portion of the gaseous mixture from the junction. A regulating device located in the bypass mechanism, between the atmosphere and the pump inlet, regulates the amount of the gaseous mixture drawn off. The regulating device responds to the pressure difference between the junction of the flow restricting devices and the reaction chamber to maintain a constant pressure at the junction. Thus, it regulates in an indirect but highly accurate manner the flow rate of sample mixture into the reaction chamber. The sample mixture reaching the reaction chamber passes only through the flow restricting devices, both of which have fixed restrictions and can be made of inert materials such as glass.

Proper flow control over a wide range of sample mixture source pressures and improved life are achieved by the location of the regulating devices between the inlet of the bypass pump and the atmosphere. The inlet pressure of the bypass pump is controlled by regulating air flow from the atmosphere and that inlet pressure in turn determines the pressure at the junction of the flow restricing devices. None of the 8c01352Torr mixture contacts the regulating device.

The flow control system is useful with any analytical instrument that required constant gas flow rates and the term "reaction" as used herein is intended to include flame ionization processes, light absorption and scattering processes, chemiluminescent processes, etc.

An important application of the system lies in the use of the aforementioned chemiluminescent detector for analysing exhaust gases from vehicles. A certain volume of the exhaust gases usually is collected and at some later time that volume is analyzed for various gaseous constituents including nitric oxide and nitrogen dioxide. If rigid collection containers are used, depletion of the volume during analysis reduces the pressure of the remainder and thereby tends to reduce flow rates into the detector. Analyzing exhaust gases directly from the vehicle exhaust system also produces pressure changes that are eliminated by the system of this invention.

DETAILED DESCRIPTION OF THE DRAWINGS

Figure 1:
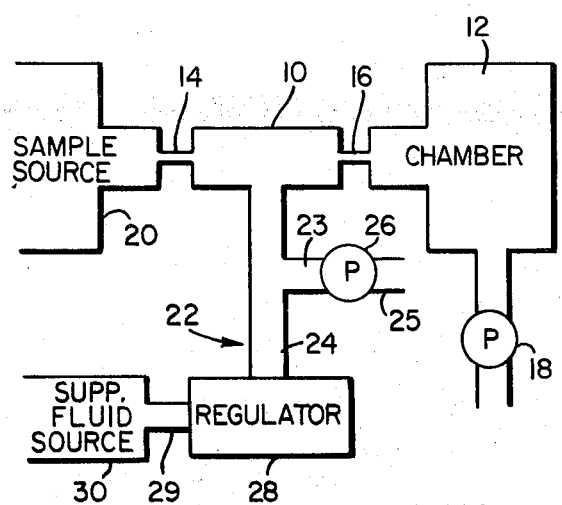
FIG. 1 illustrates one embodiment of the flow control system of this invention.

Referring to FIG. 1, an intake conduit means 10 leading to a chamber 12 is provided with an upstream flow restricting device 14, a downstream flow restricting device 16 and a pump 18. The pump 18 maintains the chamber 12 at a sufficiently low pressure to continuously draw fluid sample from the source 20, through the inlet conduit 10 and the flow restrictions 14 and 16. From between the flow restrictions 14 and 16, there extends a bypass flow means 22 including a conduit 24, a suction pump 26 having an inlet 23 and an outlet 25, and a regulator 28 in communication with a supplementary fluid source 30.

Figure 2:
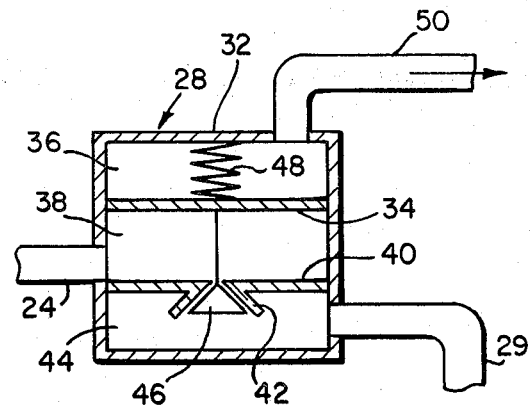
FIG. 2 is a detailed view showing a preferred embodiment of a component of the apparatus of FIG. 1.

In operation, a substantially constant flow of fluid sample must enter the chamber 12 regardless of conditions, such as pressure variations at the sample source 20. Operation may be initiated by energizing both the pumps 18 and 26 so that fluid sample will be drawn through the flow restrictions 14 and 16 to the chamber 12 with some of the fluid sample which passes the flow restriction 14 being drawn off along the bypass conduit 24 and discharged by the pump 26 through its outlet 25. The pump 26 is also capable of drawing fluid from the supplementary fluid source 30, through the regulator 28. It will be readily appreciated that the amount of fluid sample drawn from between the flow restrictions 14 and 16 will be a function of the amount of supplementary fluid drawn from the source 30. To effect the proper control, the regulator 28 controls the amount of supplementary fluid entering the bypass conduit 24 as a function of the amount of fluid sample being drawn by the pump 18 from the fluid sample source 20. One manner in which this is done may be understood by reference to FIG. 2 wherein there is shown in detail one embodiment of a regulator 28 suitable for use with the flow control device of FIG. 1.

The regulator 28 comprises a housing 32 having a movable diaphragm 34 which divides the interior into a reference chamber 36 and a controlled pressure chamber 38. The controlled pressure chamber 38 is connected to the bypass flow conduit 24, which is in communication with the inlet 23 to the pump 26 and the junction between flow restricting devices 14 and 16. The reference chamber 36 provides reference pressure which can be compared to the pressure between the flow restrictions 14 and 16. Any desired source of pressure may be used to establish the reference pressure. For example, the chamber 36 may be sealed and fluid or spring biased or it may be in communication with the atmosphere or another external source of pressure. If the reference chamber 36 is sealed, the reference pressure may be provided solely by a spring 48. Alternately, the reference chamber 36 may be associated with a communication means 50 so that the reference pressure may be functionally related to an input other than the spring 48. When the pressure source for the pressure chamber 36 is provided through the means 50, use of the spring 48 is optional. A baffle 40 having a valve seat 42 separates the chamber 38 from an inlet chamber 44. The chamber 44 is connected to the supplementary fluid source 30 by a means 29. A valve member 46 is connected to the diaphragm 34 for cooperation with the valve seat 42.

Fluid sample is drawn from the source 20 through the flow restriction 14. The pump 18 draws some of the sample through the flow restriction 16 and into the chamber 12. The pump 25 draws off fluid sample from between the flow restrictions and draws supplementary fluid through the regulator 28. The regulator 28 responds to the pressure difference between the reference pressure and the pressure existing between flow restrictions 14 and 16. Therefore, when pressure between the flow restrictions decreases, the regulating device 28 operates to increase the valve opening. The resulting increase in the flow of supplementary fluid through the pump 26 reduces the amount of fluid sample drawn from between the flow restrictions and thereby maintains the desired pressure between the flow restrictions. On the other hand, an increase in the pressure between the flow restrictions results in a decrease in the valve opening. The resulting decrease in the flow of supplementary fluid through the regulating device 28 causes a corresponding increase in the flow of fluid sample through the bypass pump 26. The increase in the flow of fluid sample from between the restrictions restores the desired pressure between the flow restrictions. The substantially constant pressure between the flow restrictions 16 and 18 establishes a substantially constant flow to the chamber 12 through the flow restriction 16.

Figure 3:
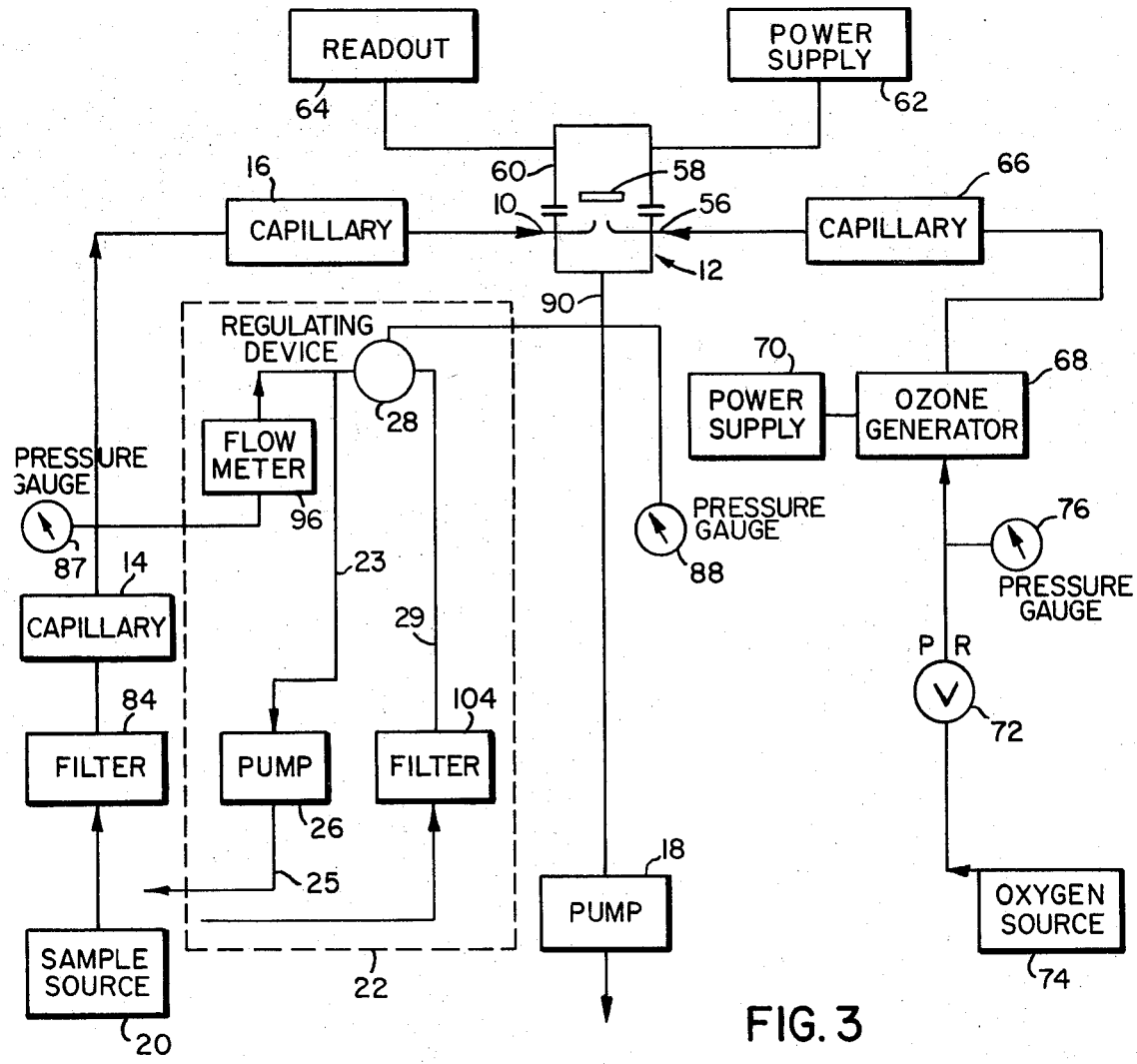
FIG. 3 is a schematic view illustrating an analytical instrument having the flow control system of FIG. 1.

Reference is now made to FIG. 3 wherein there is shown a chemiluminescent detector for measuring amounts of nitric oxide in a gaseous sample mixture by reaction with an oxygen-ozone reactant mixture. Like numerals are used to designate parts analogous to those shown in FIGS. 1 and 2. The chemiluminescent detector includes a reaction chamber 12 communicating with a sample conduit means 10 and reactant conduit 56. A light transmitting element 58 is located in one wall of the reaction chamber 12 and a light detecting device 60 is located outside of light transmitting element 58. An electrical power supply 62 and amplifying and readout circuitry 64 are connected to light detecting device 60.

A reactant conduit 56 is connected through a capillary 66 to an ozone generator 68. The ozone generator 68 is supplied with electrical power by a power source 70. A regulating device 72 connects the ozone generator 68 with an oxygen source 74 and a pressure gauge 76 indicates the pressure between the regulating device 72 and the ozone generator 68.

The sample conduit 10 is connected to a first or downstream capillary 16. Capillary 16 is in series with an upstream capillary 14 and capillary 14 is connected through a filter 84 to a gaseous sample mixture source 20. A pressure gauge 87 is connected to the junction of capillaries 14 and 16. A pressure gauge 88 is connected to the outlet 90 of the reaction chamber and an exhaust pump 18 connects outlet 90 with the atmosphere.

A bypass flow mechanism indicated by dashed line 22 comprises a rotameter 96 connected to the junction of capillary 14 with capillary 16. The outlet of rotameter 96 is connected to the inlet 23 of a bypass pump 26. Inlet 23 is connected through a pressure regulating device 28 and an air filter 104 to the atmosphere.

The reference pressure for the pressure regulating device 28 is obtained by a connection between the pressure regulating device and the outlet 90 of the reaction chamber 12. The reference pressure is thereby substantially equal to the pressure within the reaction chamber 12. The reference pressure of the regulating device 28 can be established other than by connection of the regulating device to the reaction chamber 12. For example, a reference pressure chamber may be sealed or connected to another suitable pressure source. One such suitable pressure source is the ambient atmosphere. When reference pressure is functionally related to atmospheric pressure, operation is enhanced by eliminating the effects of atmospheric pressure changes.

Pumps 18 and 26 both preferably are of the constant volume type. Capillaries 66 and 16 both provide relatively high flow restrictions while capillary 14 provides a somewhat lower flow restriction. Each of the capillaries typically is made of glass. Filter 84 preferably is made of porous sintered inert metal; stainless steel operated at approximately room temperature is suitable. Substantially pure oxygen is supplied by oxygen source 74 and ozone generator 68 produces a reactant mixture containing about 2 percent ozone with the balance oxygen.

Operation of the detector occurs in the following manner. Pumps 18 and 26 are started and the ozone generator 68 is activated. The regulator 72 is adjusted to achieve a predetermined reading on gauge 76 that is known to produce the desired flow rate of reactant mixture into the reaction chamber at the operating pressure of the reaction chamber. A typical reaction chamber pressure is about 5 Torr and a typical reactant mixture flow rate is about 120 cc. per min.

Gaseous sample mixture is drawn from source 20 through filter 84 and capillary 14 to the junction of capillary 14 with capillary 16. Pump 18 draws some of the sample mixture reaching the junction through capillary 16 and into the reaction chamber. Pump 26 draws off sample mixture from the junction and draws air through the filter 104 and the regulator 28. The regulator 28 is adjusted manually to obtain a predetermined pressure reading on gauge 87, typically about 60–700 mm. Hg. absolute, that produces the desired flow rate of sample mixture into the reaction chamber.

Regulating device 28 then begins monitoring the pressure difference between the junction of the capillaries and the reference pressure from the reaction chamber. Any decline in the pressure at the junction of the capillaries is converted by regulating device 28 into an increased air flow through the regulating device. Increased air flow through the regulating device reduces the amount of sample mixture flow from the junction of the capillaries to the inlet of the bypass pump and thereby restores the desired pressure at the junction of the capillaries. The constant pressure at the junction of the capillaries insures constant flow through the capillary 16. Similar operation compensates for any increases in the pressure at the junction of the capillaries.

Halting sample mixture flow betwen sample source 20 and the junction of the capillaries is manifested by a reduction in the pressure at the junction. The regulating device 28 can compensate for the pressure reduction in the manner described above. An external indication of the fact that no sample mixture is flowing into the reaction chamber is provided by the rotameter 96. Other flow indicating devices can be substituted for rotameter 96 if desired.

This invention provides a gas flow control system that maintains automatically a constant flow rate of sample mixture into a chamber. The invention is useful particularly in a chemiluminescent detector, but it also can be used in other analytical instruments requiring a constant sample mixture flow rate.

I claim:

1. A flow control system for maintaining a substantially constant flow of fluid sample into a chamber comprising;
   a. conduit means, including upstream and downstream flow restriction means in series with each other, for conducting the fluid sample to said chamber;
   b. bypass flow means connected between said flow restriction means, said bypass flow means including suction means for drawing off a portion of the fluid sample that has passed through said upstream flow restriction means;
   c. means establishing communication between the inlet of said suction means and a source of supplementary fluid; and
   d. means located in said communication means for regulating the quantity of supplemental fluid drawn to said suction means, to thereby influence the pressure between said upstream and downstream flow restriction means and the flow of fluid sample to said chamber.

2. The instrument of claim 1 in which the regulating means comprises a housing, a movable diaphragm separating the interior of said housing into a reference chamber and a regulated pressure chamber, a baffle separating the regulated pressure chamber from an inlet chamber, and a valve member attached to said movable diaphragm for movement toward and away from a valve seat located in said baffle, said regulated pressure chamber being connected between said upstream and downstream flow restriction means, and said inlet chamber being connected to said source of supplemental fluid.

3. An instrument according to claim 1 wherein said fluid sample and said supplementary fluid are gaseous.

4. An instrument according to claim 1 wherein said suction means comprises a pump.

5. In an instrument for measuring analytically the amount of a gaseous constituent in a gaseous sample mixture by introducing the gaseous sample mixture into a reaction chamber and measuring a characteristic of the gaseous constituent within the reaction chamber, a flow control system for maintaining accurate flow of the gaseous sample mixture into the reaction chamber comprising:
   a. an upstream flow restricting device and a downstream flow restricting device in series with each other for conducting the gaseous sample mixture to the reaction chamber;
   b. bypass flow means connected to the junction of the upstream flow restricting device with the downstream flow restricting device, said bypass flow means including a bypass pump for drawing off a portion of the gaseous sample mixture that has passed through the upstream flow restricting device and means connecting the inlet of said bypass pump to a source of supplemental gas;
   c. regulating means located in said connecting means for regulating the flow of supplemental gas to said bypass pump and thereby influencing the pressure at the junction of the flow restricting devices; and
   d. an exhaust pump connected to the reaction chamber for drawing gaseous sample mixture from the junction of the flow restricting devices through the downstream flow restricting device and into the reaction chamber.

6. An instrument according to claim 5 wherein said connecting means connects the inlet of said bypass pump to the atmosphere.

7. An instrument according to claim 5 in which the reaction occurring within the reaction chamber produces chemiluminescence.

8. An instrument according to claim 5 in which the regulating means comprises a housing, a movable diaphragm separating the interior of said housing into a reference chamber and a regulated pressure chamber, a baffle separating the regulated pressure chamber from an inlet chamber, and a valve member attached to said movable diaphragm for movement toward and away from a valve seat located in said baffle, said regulated pressure chamber being connected to the junction of said flow restricting devices, and said inlet chamber being connected to said source of supplemental fluid.

* * * * *